United States Patent
Li et al.

(10) Patent No.: US 8,068,110 B2
(45) Date of Patent: Nov. 29, 2011

(54) REMOTE DISPLAY METHOD AND SYSTEM FOR A MONITOR APPARATUS

(75) Inventors: Changjian Li, Shenzhen (CN); Xu Luo, Shenzhen (CN); Jianjun Peng, Shenzhen (CN); Liqiang Ming, Shenzhen (CN); Jin Zhang, Shenzhen (CN)

(73) Assignee: Shenzhen Mindray Bio-Medical Electronics Co., Ltd., Shenzhen (CN)

( * ) Notice: Subject to any disclaimer, the term of this patent is extended or adjusted under 35 U.S.C. 154(b) by 1019 days.

(21) Appl. No.: 11/956,134

(22) Filed: Dec. 13, 2007

(65) Prior Publication Data
US 2008/0239074 A1    Oct. 2, 2008

(30) Foreign Application Priority Data
Mar. 26, 2007    (CN) .......................... 2007 1 0073702

(51) Int. Cl.
  *G09G 5/00* (2006.01)
  *G06T 1/00* (2006.01)
(52) U.S. Cl. ........... 345/522; 345/1.2; 345/2.1; 345/2.2; 345/2.3
(58) Field of Classification Search .................. 345/522, 345/1.2, 2.1, 2.2, 2.3
See application file for complete search history.

(56) References Cited

U.S. PATENT DOCUMENTS

| 5,699,038 A | 12/1997 | Ulrich et al. |
| 5,838,718 A * | 11/1998 | Ichihashi ...................... 375/133 |
| 2005/0085760 A1 | 4/2005 | Ware et al. |

FOREIGN PATENT DOCUMENTS

| CN | 1291749 | 4/2001 |
| CN | 1341888 | 3/2002 |
| CN | 1907214 | 2/2007 |
| CN | 1943505 | 4/2007 |
| CN | 1973763 | 6/2007 |
| JP | 08000573 | 9/1996 |
| TW | 248045 | 1/2006 |

OTHER PUBLICATIONS

Feng Xu et al., 'Embedded ECG Monitoring Analyzer Based on PDA', 8 (3) BME & Clin. Med. 177 (Sep. 2004) (Chinese).
Wei Xiong et al., 'Multiple Physiological Parameter Dynamic Tele-Monitoring System Based on Internet', 10 Computer Engineering & Application 223 (2006) (Chinese).

* cited by examiner

*Primary Examiner* — Hau Nguyen
(74) *Attorney, Agent, or Firm* — Kory D. Christensen; Stoel Rives LLP

(57) ABSTRACT

A remote displaying method for monitor apparatus, comprises: converting step, for converting a plurality of graphic elements which constitute a displayed graphic on the monitor apparatus into a plurality of corresponding display instructions; transmitting step, for transmitting the display instructions to a remote display apparatus; receiving step, for receiving the display instructions on the remote display apparatus; and displaying step, for displaying on the remote display apparatus in accordance with the display instructions.

17 Claims, 5 Drawing Sheets

REMOTE DISPLAY METHOD AND SYSTEM FOR A MONITOR APPARATUS

FIELD OF ART

The present application relates to a method and system for performing display on a remote display apparatus. In particular, it relates to a method and system for remotely displaying the content on the screen of a monitor apparatus used in medical treatment field.

BACKGROUND ART

In medical treatment field, the monitor apparatus is widely used in detecting the physiological parameters of a patient and displaying the detected physiological parameters on a display apparatus for reviewing by a doctor in real time. Usually, the physiological parameters are displayed in real time in the room where the patient stays. However, there is a need for the doctor to remotely view the physiological parameters in a place different from where the patient locates. Therefore, it is a very important function to view the detected physiological parameters on an apparatus remote from the patient in real time.

In the prior art, there are several approaches to view the detected physiological parameters remotely. Wherein, one of most usually employed approaches lies in capturing the graphics displayed on the screen of monitor apparatus by software and sending the captured graphics to a remote apparatus for displaying. One of the main drawbacks of this solution lies in the large amount of data to be transmitted, which requires an increased bandwidth of network. Since there is a large amount of data to transmit, it is very difficult to meet the requirement of viewing the graphics on a remote display apparatus in real time.

Another approach in prior art is to send the detected physiological parameters, such as values of pulse rate, values of blood pressure, etc, directly from a monitor apparatus to a remote display apparatus for viewing. The remote device receives those parameters and then constructs its own display interface based on those received parameters. Since the monitor apparatus can not control the property of the interface on the remote device, the interface on the monitor apparatus may be very different from that of the remote device. In such a case, the viewers may be confused when frequently switched between those two types of interfaces. Moreover, the remote devices in this case require a higher processing capability to construct its own interface from the received parameters. Consequently, the manufacturing cost and maintenance cost of those remote devices are very expensive.

SUMMARY OF THE INVENTION

One of the main objects of present invention lies in solving the technical problems in prior art, and providing a screen remote displaying method and system used in monitor apparatus. The method and system can display content exactly the same as that on monitor apparatus at a remote device in real time and a reduced cost. By virtue of such a method and system, the content on the screen of a monitor apparatus can be transmitted to a remote display apparatus connected with the monitor apparatus via network in time sequence. The remote display apparatus can obtain a better effect in remotely displaying graphics on the screen of monitoring device in real time. Moreover, in the system proposed by present invention, the data transmission for the remote display apparatus occupies less bandwidth of network.

Another object of the invention lies in providing a method and system for remote displaying monitor apparatus screen, which can display the graphics smoothly in accordance with time sequence in the case of the system clocks in the monitor apparatus and the remote display apparatus are not coincide with each other or in the case of the network has a blockage.

A remote displaying method for monitor apparatus is proposed to obtain above mentioned objects. The method comprises: converting step, for converting a plurality of graphic elements which constitute a displayed graphic on the monitor apparatus into a plurality of corresponding display instructions; transmitting step, for transmitting the display instructions to a remote display apparatus; receiving step, for receiving the display instructions on the remote display apparatus; and displaying step, for displaying on the remote display apparatus in accordance with the display instructions.

Moreover, the converted display instructions include the types, coordinates and attributes of the graphic elements.

Moreover, in the transmitting step, the converted display instructions are packed into a packet in accordance with their generating sequence in every first predetermined time period, and a display time identifier, which increases once at an interval of first predetermined time period, is added into the packet.

Moreover, the transmitting step also comprises: a plurality of the display instruction packets are transmitted to the remote displaying apparatus at an interval of second predetermined time period.

Moreover, the first predetermined time period is a time period for displaying n graphics generated by the monitor apparatus, and n is an integer larger than zero; the second predetermined time period is a multiple of the first predetermined time period.

Moreover, the receiving step comprises: the received display instruction packets are stored in a buffer, and the display instruction packets are fetched out at an interval of a displaying time period; the display instructions in the display instruction packets are extracted out and sent to displaying part in accordance with the generating sequence of display instructions.

Moreover, the remote displaying apparatus generates a remote display time identifier, and the remote display time identifier increases once in every displaying time period; in the first displaying time period, the remote display time identifier is set as equal to the minimum display time identifier in the received display instruction packets; the display time identifier in the received display instruction packets are compared with the remote display time identifier when the display instruction packets are fetched out; and only the display instruction packets containing a display time identifier less than the remote display time identifier are fetched out.

Moreover, the length of displaying time period is equal to that of the first predetermined time period; the receiving step also comprises: the remote display time identifier is corrected based on the number of display instruction packets stored in the buffer.

Moreover, in the case of the number of the display instruction packets stored in the buffer is larger than a predetermined value, the remote display time identifier is increased; in the case of the number of display instruction packets stored in the buffer is less than the predetermined value, the remote display time identifier is reduced; and in the case of the number of display instruction packets stored in the buffer is equal to the predetermined value, the current remote display time identifier is kept unchanged.

A monitor apparatus for performing remote display is proposed in present invention. The apparatus comprises: converting unit, for converting a plurality of graphic elements which constitute a displayed graphic on the monitor apparatus into a plurality of corresponding display instructions; and transmitting unit, for transmitting the display instructions to a remote display apparatus.

Moreover, the converted display instructions include the types, coordinates and attributes of the graphic elements.

Moreover, the display instructions are packed into a packet in accordance with their generating sequence in every first predetermined time period by the converting unit, and a display time identifier, which increases once at an interval of first predetermined time period, is added into the packet.

Moreover, the transmitting unit transmits a plurality of display instruction packets to the remote displaying apparatus at an interval of second predetermined time period; and the first predetermined time period is a time period for displaying n graphics generated by the monitor apparatus; n is an integer larger than zero, and the second predetermined time period is a multiple of the first predetermined time period.

A remote display apparatus for remotely displaying graphics is proposed in present invention. The apparatus comprises: receiving unit, for receiving packets composed of display instructions; the display instructions correspond to graphic elements which constitute a graphic to be displayed, respectively; and displaying unit, for performing display on the remote display apparatus in accordance with the display instructions obtained from the packets.

Moreover, the received display instructions include the types, coordinates and attributes of the graphic elements, and a display time identifier which increases sequentially is included in every display instruction packet.

Moreover, the received display instruction packets are stored in a buffer, and the display instruction packets are fetched out at an interval of a displaying time period; the display instructions in the display instruction packets are extracted out and sent to a displaying part in accordance with their generating sequence.

Moreover, wherein, a remote display time identifier generated by the remote displaying apparatus increases once in every displaying time period; in the first displaying time period, the remote display time identifier is set as equal to the minimum display time identifier in the received display instruction packets; the display time identifiers in the received display instruction packets are compared with the remote display time identifier when the display instruction packets are fetched out; and only the display instruction packets containing a display time identifier less than the remote display time identifier are fetched out.

Moreover, in the receiving unit, the current remote display time identifier is corrected based on the number of display instruction packets stored in the buffer.

Moreover, in the case of the number of display instruction packets stored in the buffer is larger than a predetermined value, the current remote display time identifier is increased; in the case of the number of display instruction packets stored in the buffer is less than the predetermined value, the current remote display time identifier is reduced; and in the case of the number of display instruction packets stored in the buffer is equal to the predetermined value, the current remote display time identifier is kept unchanged.

A remote display system for monitor apparatus is proposed in present invention. The system comprises a monitor apparatus and a remote displaying apparatus according to present invention.

The advantages of present invention lies in that: First, an approach for transmitting display instruction packets is adopted, which reduces the amount of data to be transmitted and saves the bandwidth of network. At the same time, the display time identifier is recorded in the display instruction packets before transmitting the same, such that the reproducing and displaying time of display instruction packets in the remote display apparatus can be controlled. Therefore, the displayed content of the monitor apparatus can be displayed on remote display apparatus in real time at a correct time sequence. The requirement for real time display in a remote apparatus is thereby obtained. Second, the remote display time identifier on the remote display apparatus is corrected in accordance with the number of packets in the buffer, such that the speed of display can be controlled. Therefore, the displayed content can be prevent from affected by the difference between the system clocks in monitor apparatus and remote display apparatus and/or by the blockage occurred in network. The smoothness of display is thereby ensured.

BRIEF DESCRIPTION OF DRAWINGS

The features and advantages of present invention will become apparent from the following descriptions accompanied with the figures.

THE BEST MODES TO CARRY OUT THE INVENTION

The First Embodiment

Figure 1:
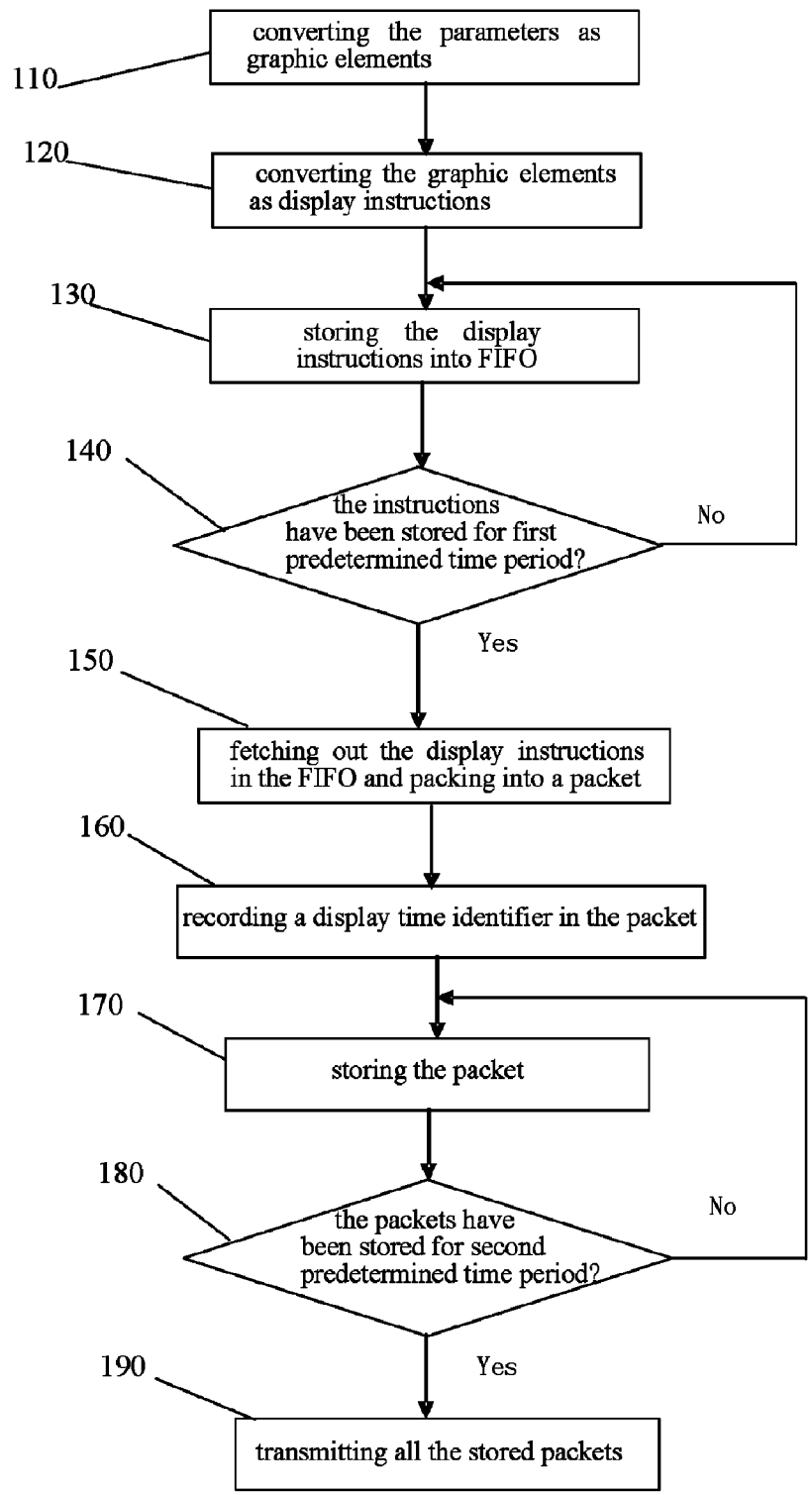
FIG. 1 shows the flowchart of a procedure implemented by a monitor apparatus according to one embodiment of present invention.

According to the first embodiment of the invention, a remote displaying method is proposed. Wherein, a plurality of display instructions are used to represent the graphics displayed on the display device of the monitor apparatus. The display instructions are transmitted to the display device of the monitor apparatus, and they are also transmitted to a remote display apparatus through network at a time sequence in real time. The remote display apparatus which connects with the monitor apparatus receives the display instructions with time sequence and reproduces the display instructions into graphics on the screen at the same time sequence. The content the same as the display device of the monitor apparatus is thereby displayed on a remote display apparatus in real time.

The display device of the monitor apparatus is usually controlled by a piece of FPGA (Field Programmable Gates Array) device. Specifically, in an embodiment of present invention, the FPGA device is embedded with operations to the video memory of the display device of the monitor apparatus, such that it provides display control operations to the application layer. For example, the screen graphic may represent by several graphic elements, such as dots, horizontal lines, vertical lines, slanting lines, rectangular, bitmaps, and characters etc. Every individual graphic element corresponds to one specific display instruction. For example, the instruction corresponds to a horizontal line may comprise: the type of the graphic element (i.e. horizontal line), the coordinates of start point or end point of the graphic element, the length of the graphic element, and the color of the graphic element. The display instruction corresponds to a rectangular may comprise: the type of the graphic element (i.e. rectangular), the coordinates of two vertexes on the diagonal of the rectangular, and the color of the rectangular. Other parameters can be added into the instruction or some of the parameters can be removed from the instruction in accordance with the practical application.

FPGA device can be used in converting the display instructions received from monitor apparatus to the data of video memory in display device of monitor apparatus. The logic to implement this conversion is described in prior art in detail, and the description thereof is omitted for the sake of conciseness. It should be noted that the device used to perform this conversion process is not limited to the FPGA, any other suitable specific processors, general purpose processors or various types of programmable logic devices can be used.

In the remote display apparatus which receives the instructions sent by monitor apparatus, a FPGA device equivalent to that on the display device of the monitor apparatus is also included. Since the above described display instruction controlling approach is used to realize remote display, it requires that the logic of the FPGA devices in both of display device of the monitor apparatus and remote display apparatus produce the same result with respect to the same display instructions. Therefore, both of the apparatuses can correctly convert the display instructions into the same graphics.

In the monitor apparatus, the system program thereof controls the display of several screens directly or indirectly. The screens being controlled include the screen on display device of the monitor apparatus and the screens on remote display apparatuses. Every screen is controlled by display instructions. The instructions for the display device of the monitor apparatus are sent to the FPGA thereof by the monitor apparatus and used to implement display process. The instructions for the screens of remote display apparatuses are transmitted to them through network. Then the system programs on the remote display apparatuses send the received instructions to the FPGA on the remote display apparatus for implementing display process.

The process performed by the monitor apparatus is described in detail with reference to the accompanied figures thereafter. According to FIG. 1, the procedure performed on the monitor apparatus includes the following steps:

In step 110, the monitor apparatus detects the physiological parameters and converts the detected physiological parameters into corresponding graphic elements, such as dots, horizontal lines, vertical lines, slanting lines, rectangular, bitmaps, and characters, etc. Said graphic elements are combined to form the graphics to be displayed on the display device of the monitor apparatus. Then, the procedure proceeds to step 120.

In step 120, the monitor apparatus converts the graphic elements into display instructions. Every graphic element corresponds to one piece of display instruction. Every type of graphic element has its corresponding display instruction. Then, the procedure proceeds to step 130.

In the embodiment, the display instructions converted by the monitor apparatus are provided to the FPGA device on the display device of the monitor apparatus. Then the instructions are converted into the graphic elements to be displayed. The graphics corresponding to the physiological parameters are thereby displayed on the display device of the monitor apparatus.

In step 130, the display instructions provided to the display device of the monitor apparatus are stored in a buffer on the monitor apparatus, and then transmitted to the remote display apparatus. Since the display instructions are generated and executed in accordance with a strictly controlled time sequence, the display instructions are stored in the buffer with the same generating time sequence. The buffer for storing the display instructions is a FIFO (First In First Out) memory. Then, the procedure proceeds to step 140.

In step 140, the instructions generated in step 120 are stored in the first buffer for a predetermined time period (e.g., a first predetermined time period). It is then determined that whether the time for storing the instructions in the buffer reaches a first predetermined time period. The process proceeds to step 150 in the case of this first predetermined time period is reached. In present embodiment, for example, the first predetermined time period can be set as 40 ms. The 40 ms storing time period corresponds to the time period for displaying one frame of graphic in a 25 Hz video signal. The first predetermined time can be set as other values which equal to a period for displaying several graphics in a suitable video standard.

In step 150, all the display instructions in the FIFO are fetched out and packaged into a packet. For example, if the graphic corresponding to the detected physiological parameters comprises three horizontal lines and one rectangular, then four pieces of instructions corresponding to the graphic elements (i.e., three horizontal lines and one rectangular) are packaged into the packet at the display sequence. Then, the procedure proceeds to step 160.

In step 160, an identifier representing current time is recorded in the packet. The identifier is referred as display time identifier thereafter. In the display instruction packets, the instructions in the packet are arranged in a sequence the same as that in the FIFO from which the instructions are fetched. The display time identifier is increased once in every first predetermined time period. That is to say, the display time identifier included in current packet is larger than the display time identifiers in its preceding packets. In present embodiment, the display time identifier is generated based on the system clock on the monitor apparatus, and it increases 1 by every first predetermined time period. In other words, in every generated display instruction packet, the display time identifier therein is increased by 1. Then, the procedure proceeds to step 170.

In step 170, the display instruction packets generated at an interval of first predetermined time period are stored in a buffer in the monitor apparatus in order to reduce the frequency for transmitting the packets, reduce the load imposed on the network protocol stack, and smoothly display graphics on the remote display apparatus. Then, the procedure proceeds to step 180.

In step 180, it is determined that whether the time for storing the packets reaches a second predetermined time period. If the storing time reaches the second predetermined time period, the procedure proceeds to step 190. If not, then the procedure keeps waiting.

In step 190, all the display instruction packets in the buffer are fetched out and then sent to the remote display apparatus. That is to say, in step 190, the stored packets are fetched out and sent through network at an interval of second predetermined time period. In present embodiment, for example, the second predetermined time period can be set as 400 ms. Since one packet is generated in every 40 ms (i.e., the first predetermined time period), the numbers of packets fetched out and sent is 10 (i.e., the second predetermined time period is ten times of the first predetermined time period). It should be noted that, in accordance with practical applications, the second predetermined time period can be set as any other integral times of the first predetermined time period.

In the remote display apparatus, a buffer is disposed for receiving the display instruction packets sent from the monitor apparatus. The received display instruction packets are stored in the buffer. In the remote display apparatus, the timing for displaying the instructions in the packet is set as at a specific time interval. Wherein, the instruction packets are fetched out and displayed at the specific time interval. In this embodiment, the specific time interval is preferably set as 40 ms, which is identical with the first predetermined time period in the monitor apparatus. That is to say, the timing for displaying the instruction packets is appeared once in every 40 ms. After the display instruction packets are fetched out from the buffer, the display instructions are extracted from the packets. Then, every display instruction is sent to FPGA for performing display process at the time sequence. In order to make the displayed content in remote display apparatus coincide with that in the monitor apparatus, a time identifier representing the time in the remote display apparatus is generated therein. The time identifier is referred as remote display time identifier thereafter. The remote display time identifier is increased once at every timing for displaying the instructions. The remote display time identifier is used to control the displaying of instructions on remote display apparatus. It can be determined that which instructions of the packets in buffer would be displayed in current timing by use of said remote display time identifier.

Figure 2:
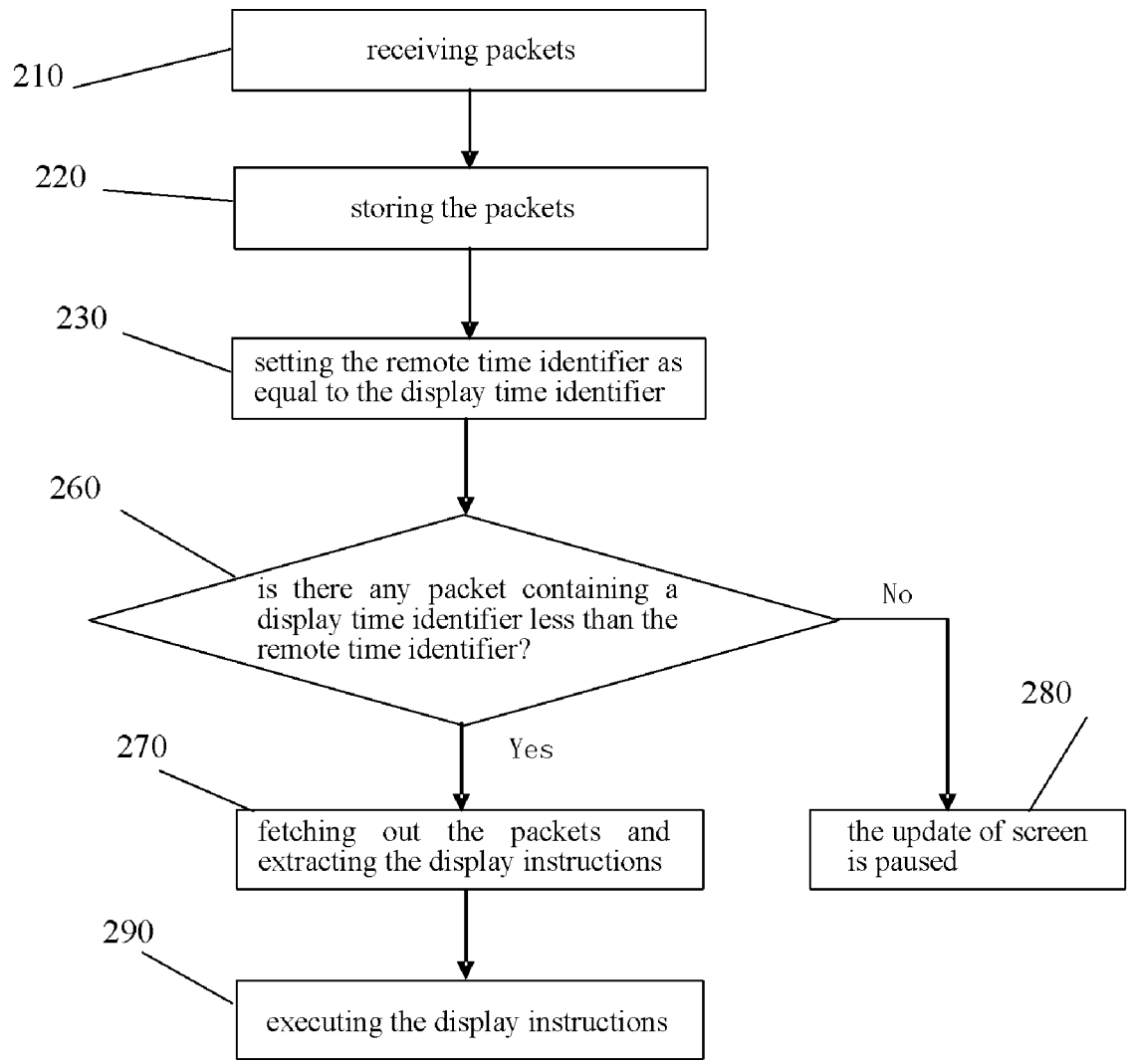
FIG. 2 shows the flowchart of a procedure implemented by a remote display apparatus according to one embodiment of present invention.

FIG. 2 shows the procedures performed by the remote display apparatus according to the first embodiment of this invention. Wherein, it comprises the following steps:

In step 210, the display instruction packets sent from monitor apparatus are received through network, then the procedure proceeds to step 220.

In step 220, the received display instruction packets are stored into a buffer, then, the procedure proceeds to step 230.

In step 230, in the first timing for displaying the instructions, the instruction packets with the minimal display time identifier is retrieved from the buffer. Then the remote display time identifier is set as equal to the retrieved minimal display time identifier. The remote display time identifier which has been synchronized with the minimal display time identifier is then increased along with the timing for displaying the instructions in the remote display apparatus. The amount of the value of remote display time identifier to be increased is identical with that of the display time identifier of the monitor apparatus. Consequently, in the case of the value of display time identifier in the monitor apparatus increases 1 every time, then the value of remote time identifier in the remote display apparatus increases 1 too. Then, the procedure proceeds to step 260.

In step 260, the packets with a display time identifier less than the remote display time identifier are retrieved from the buffer. If the packets met above criterion are existed in the buffer, the procedure proceeds to step 270. If there are no packets in the buffer meet this criterion, the procedure proceeds to step 280.

In step 270, the packets retrieved in step 260 are fetched out, and all of the instructions in the retrieved packets are extracted in accordance with the time sequence by which those instructions are generated. Then, the procedure proceeds to step 290.

In step 290, the extracted display instructions are written into FPGA device. The FPGA device performs display operations in accordance with the logic corresponding to that of the display device of monitor apparatus. When the displaying operations corresponding to those extracted display instructions are completed, the procedure returns to step 210.

In step 280, since there are no packets in the buffer met above listed criterion, no packets for displaying can be fetched during this timing for displaying. Consequently, the graphic currently displayed on the screen of the remote display apparatus is not updated during this timing for displaying. The remote display time identifier is increased in next timing for displaying, and the retrieving process is performed again. The procedure goes to step 270 in the case of the packets met the criterion are retrieved from the buffer.

According to above described embodiment, the remote displaying of graphics of monitor apparatus can be achieved in real time. This method overcomes the problem of transmitting a large amount of data, and the remote display apparatus thereby occupies less bandwidth of network than prior art.

Second Embodiment

Since the monitor apparatus and remote display apparatus may adopt different system clocks, although the monitor apparatus sends instruction packets at a constant time interval, the remote display apparatus which acts as a receiving end may not consider that those packets are sent at a constant time interval with respect to its own system clock. Moreover, since the transmission through the network may comprise unpredictable time delays, the display instruction packets are hardly received by the remote display apparatus at a constant time interval in practical application. If the display instruction packets can not be received by the remote display apparatus in a predetermined time interval, the graphics on the remote display apparatus may be displayed unstably. Therefore, according to another embodiment of present invention, the timing for displaying in the remote display apparatus is corrected. An improved display effect can be achieved by appropriately adjusting the timing for displaying of the instruction packets.

Figure 3:
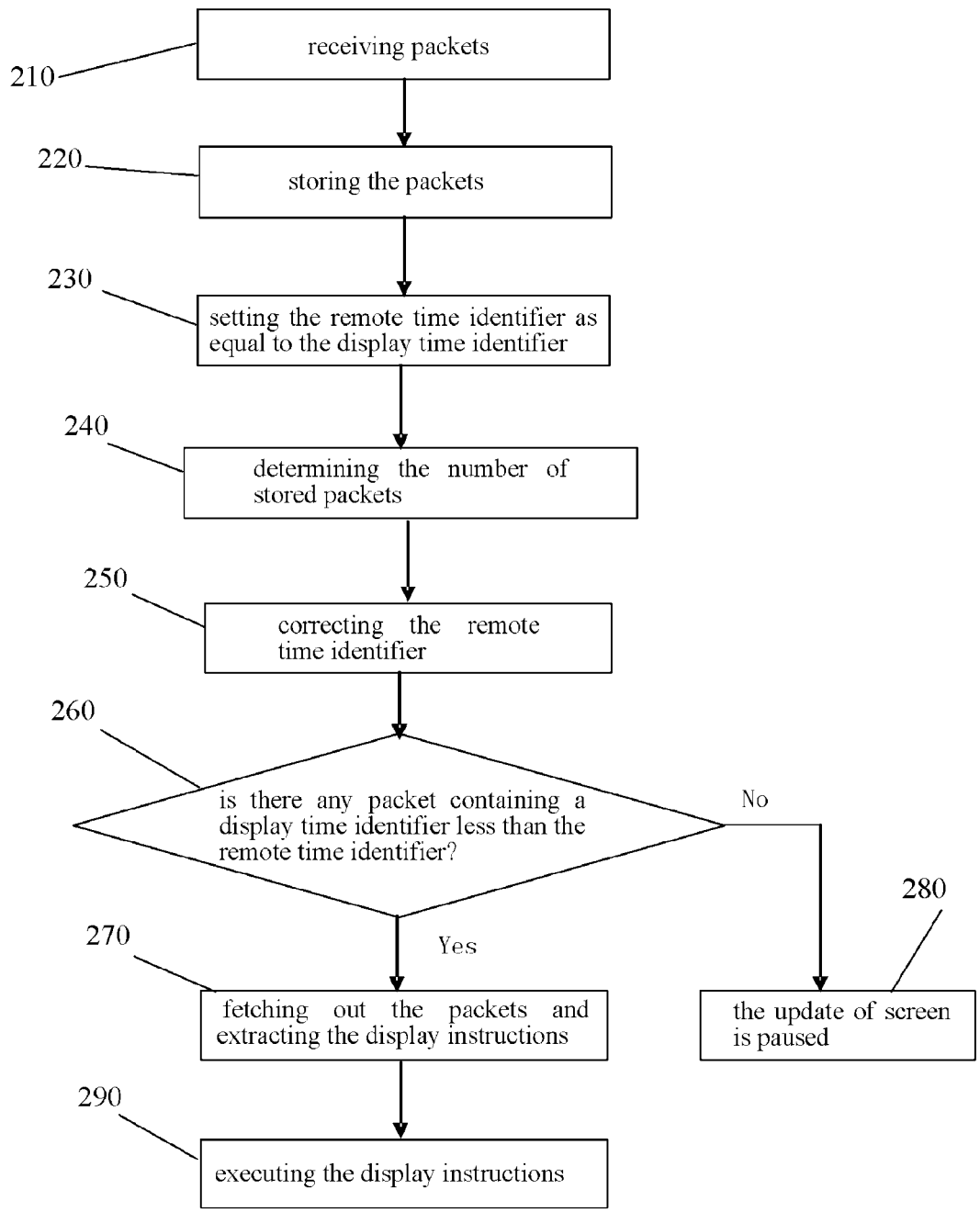
FIG. 3 shows the flowchart of a procedure implemented by a monitor apparatus according to another embodiment of present invention.

The timing for displaying of the instruction packets can be adjusted by correcting the remote display time identifier. The flowchart according to present embodiment is shown in FIG. 3. The procedure depicted in FIG. 3 further contains two remote display time identifier correcting steps 240 and 250 compared with the embodiment in FIG. 2. Step 240 is performed subsequent to step 230. That is, when one specific timing for displaying is arriving, the number of packets in the buffer is checked first, and then the procedure proceeds to step 250.

In step 250, the remote display time identifier is corrected depending on the number of packets in the buffer. One of the feasible correcting methods comprises the following steps: the correcting value of remote display time identifier is determined in accordance with the number of packets in the buffer; the new remote display time identifier is obtained by adding the correcting value to the current remote display time identifier; and the new remote display time identifier is used in step 260 for comparing with the display time identifiers of the packets in the buffer.

One of the methods to determine the correcting value comprises the following steps: the correcting value is set as a positive one when the number of packets in the buffer is larger than a predetermined value; the correcting value is set as zero when the number of packets in the buffer equals to the predetermined value; and the correcting value is set as a negative one when the number of packets in the buffer is smaller than the predetermined value. In present embodiment, the predetermined value can be set as 20, and the corresponding positive and negative correcting values can be set as ±T, respectively. That is, the remote display time identifier is increased by one when the number of packets in the buffer is larger than 20; the remote display time identifier keeps unchanged when the number of packets in the buffer equals to 20; and subtract one from the remote display time identifier when the number of packets in the buffer is less than 20.

According to above described display time identifier correcting method, the remote display time identifier adds +1 when a large amount of packets are stored in the buffer. The number of packets, whose display time identifier is less than the remote display time identifier, retrieved in step 260 increases one compared with the situation without correcting. Therefore, one more packet of display instructions should be displayed during this timing for displaying. That is, two or more packets of instructions will be displayed in one timing for displaying. The graphic's updating rate is thereby accelerated. In this situation, it equals to that the displayed graphics are accelerated by 40 ms. On the other hand, subtract 1 from the remote display time identifier when there is a relatively small amount of packets stored in the buffer. The number of packets retrieved in step 260 decreases one compared with the situation without correcting. Therefore, one less display instruction packet will be displayed during this timing for displaying. The graphic's updating rate will be slowed down. In the case of no packets can be found in step 260 by virtue of subtracting 1 from the remote displaying identifier, no packets will be fetched out and the screen is thereby controlled as not updating for 40 ms.

In the case of the system clocks on the monitor apparatus and remote display apparatus are not completely coincide with each other, the displaying correcting process described above can be very useful. For example, in the case of the clock on monitor apparatus is a little slower than that of the remote display apparatus (e.g., 40 ms difference per day), the remote display apparatus can adjust the 40 ms time difference by stopping the update of the screen for one time.

With respect to ordinary remote display apparatus, the display time delay therein should be kept small in order to make the displayed wave-forms continuous. However, the blockage occurred in network communication may cause the transmitting speed instable, which can lead to a situation in which a large amount of packets are stored in the buffer of the remote display apparatus; or even no packets for displaying are stored in the buffer. A poor display effect in the remote display apparatus is thereby occurred. In present embodiment, the remote display time identifier is corrected such that the display process on remote display apparatus is accelerated or slowed down, therefore an intermittent display can be adjusted as a smooth display. It should be noted that an accelerated display refers to such a situation in which the display instructions to be rendered in a predetermined time period is increased, and a slowed down display refers to such a situation in which the same amount of display instructions are rendered in a time period longer than the expected period. The accelerated or slowed down display do not affect the validity of the displayed graphic. The accelerated display avoids the accumulation of packets in the buffer, and decreases the possibility of content display on a remote display apparatus can not keep up with that on the monitor apparatus. On the other hand, the slowed down display ensures that a certain amount of packets are stored in the buffer, and the continuity of displaying can be thereby sustained. Since the described display correcting process is conducted in the time period of 40 ms, it is almost imperceptible to the observers.

In above embodiment, two or more packets can be displayed during one timing for displaying, or the display update may be halted in a period more than one displaying timing by correcting the remote displaying identifier. For example, the following arrangement can be made in accordance with the practical application: the remote display time identifier increases 1 when the number of packets in the buffer is larger than 20 and smaller (or equal to) than 25; the remote display time identifier increases 2 when the number of packets in the buffer is larger than 25 and smaller (or equal to) than 30; the remote display time identifier increases 3 when the number of packets in the buffer is larger than 30; and subtracts 1 from the remote display time identifier when the number of packets in the buffer is less than 20 and larger than (or equal to) 15; subtracts 2 from the remote display time identifier when the number of packets in the buffer is less than 15 and larger than (or equal to) 10; subtracts 3 from the remote display time identifier when the number of packets in the buffer is less than 10 and larger than (or equal to) 5. It should be noted that the correcting value should not be set as very large. The displayed graphic will be updated too frequently or may be not updated in a long period of time when the correcting value is set inappropriately.

According to the embodiment of present invention, the time identifier in the monitor apparatus increases one in every 40 ms, which means that all the display instructions in the 40 ms are generated in the same time period. In the remote display apparatus, the display instruction packets in the buffer are fetched out in every 40 ms after receiving the packets. All the instructions generated within a certain time range are fetched out in together. The fetched out instructions are displayed within 40 ms. In this way, the display instructions on both of the remote apparatus and local apparatus are divided into segments with a constant time interval of 40 ms. Therefore, the consistency between the remote apparatus and local apparatus are ensured.

Figure 4:
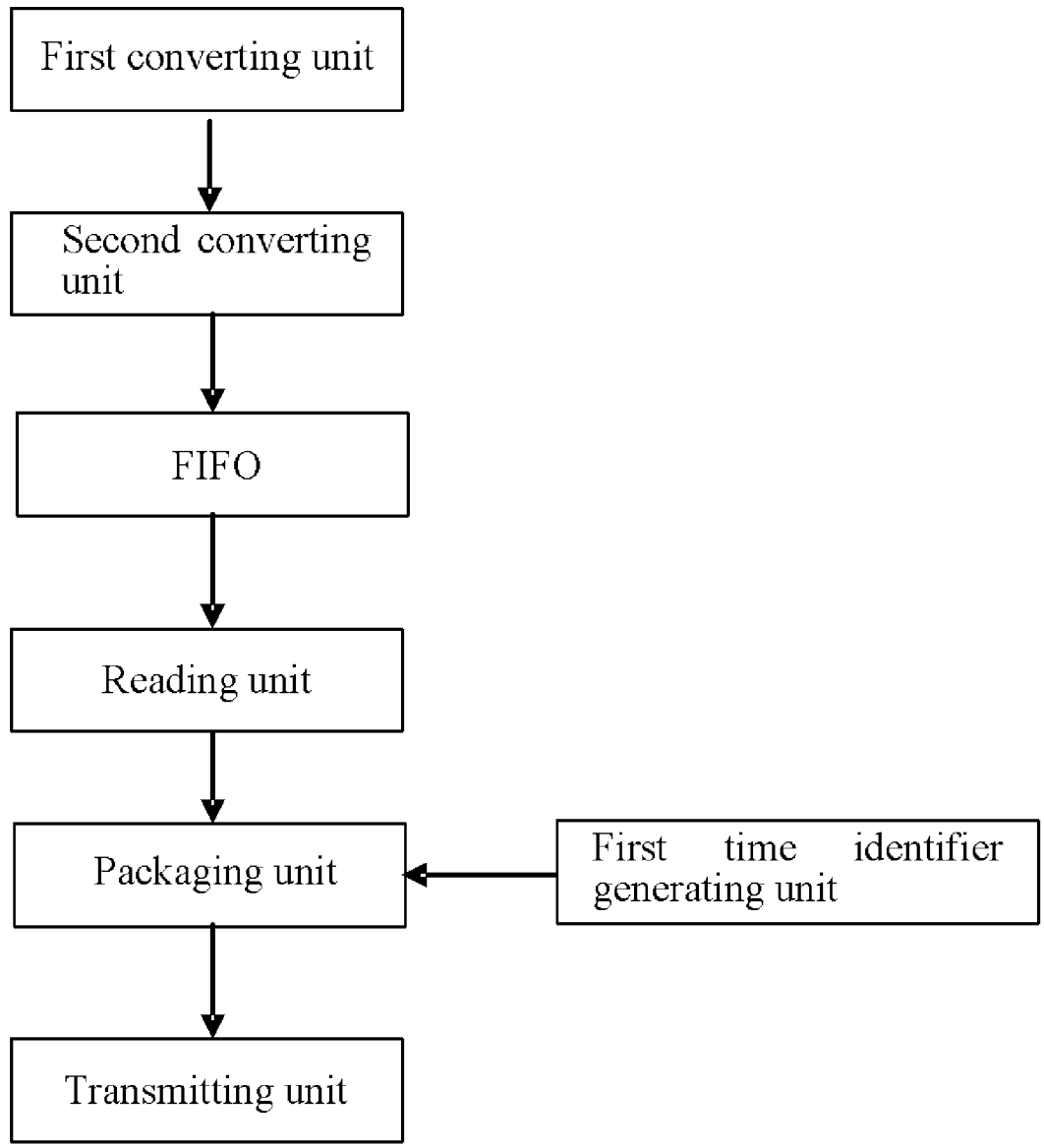
FIG. 4 shows the block diagram of a monitor apparatus according to one embodiment of present invention.
Figure 5:
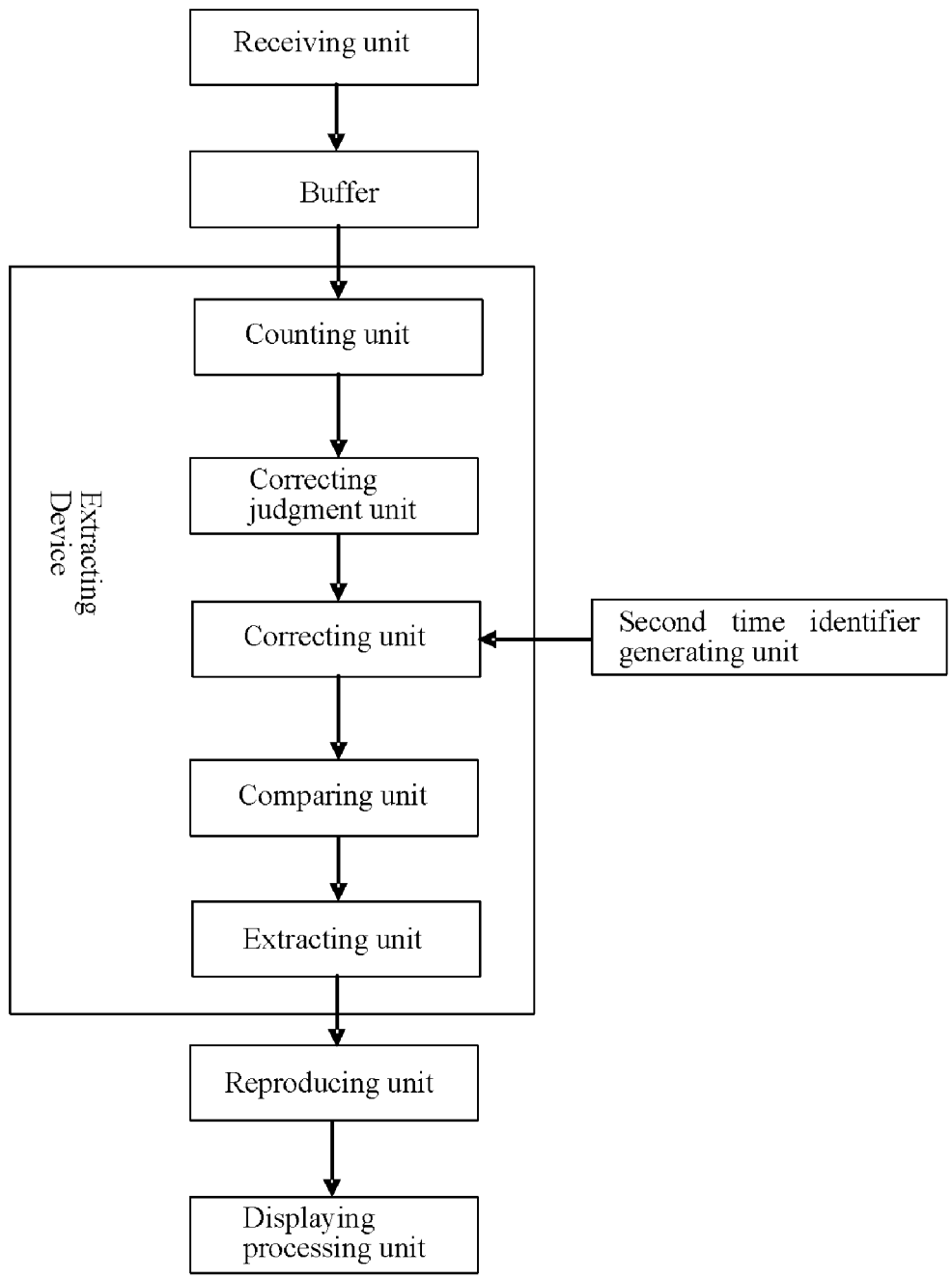
FIG. 5 shows the block diagram of a remote display apparatus according to one embodiment of present invention.

The system configurations for implementing above embodiments are shown in FIG. 4 and FIG. 5. Wherein, FIG. 4 shows the block diagram of the components included in the monitor apparatus, and the components less related to the embodiment present invention are omitted for the sake of simplicity. Specifically, the shown monitor apparatus includes: a first converting unit for converting the detected physiological parameters into corresponding graphic elements; a second converting unit for converting the graphic elements into corresponding display instructions; a FIFO memory for temporarily storing the display instructions in accordance with the sequence they generated; a reading unit for fetching out all the display instructions in the FIFO memory at an first predetermined time interval; a packaging unit for packaging the display instructions into a packet; a transmitting unit for transmitting the display instruction packets to a remote display apparatus; and a first time identifier generating unit for generating a display time identifier which increases once in every first predetermined time interval. The packaging unit packages the display instructions fetched out from the FIFO memory into a display instruction packet, and records a display time identifier representing the time for performing the packaging process in the packet.

FIG. 5 shows a block diagram of the components included in the remote display apparatus. Specifically, it comprises: a receiving unit for receiving the display instruction packets sent from the monitor apparatus; a buffer for temporarily storing the received display instruction packets; an extracting unit for extracting the display instructions from the buffer at a time interval of displaying timing; a reproducing unit for reproducing the display instructions in the display instruction packets; and a display processing unit for performing displaying in accordance with the display instructions. The display instructions are sent to the display processing unit by the reproducing unit. The display instructions are converted to graphics on the screen by the display processing device. The remote display apparatus may further comprise a second display time identifier generating unit for generating a remote display time identifier. The remote display time identifier increases in every displaying timing. The extracting unit comprises: a counting unit for counting the number of packets in the buffer; a comparing unit for comparing all the display time identifiers of the packets in the buffer with the remote display time identifier in every displaying occasion; and a reading unit for fetching all the packets whose display time identifiers are less than the remote display time identifier.

According to another embodiment of present invention, the extracting unit may further comprise a correcting judgment unit for determining the correcting value of the remote display time identifier depending on the number of packets in the buffer. The correcting judgment unit sets the correcting value as a positive one when the number of packets in the buffer exceeds a first predetermined value, and sets the correcting value as a negative one when the number of packets in the buffer is less than the first predetermined value; and sets the correcting value as zero when the number of packets in the buffer equals to the first predetermined value. The extracting unit may further comprise a correcting unit for obtaining an updated remote display time identifier by adding the correcting value to the current remote display time identifier. In this embodiment, the comparing unit compares the display time identifiers in the display instruction packets with the corrected remote display time identifier, and fetches out the some of the packets for executing a display processing in accordance with the result of the comparison.

In conclusion, according to the embodiment of present invention, the displaying operations of screen graphic are packaged into a display instruction controlled approach via the FPGA device and other logic devices for performing display control. The generated display instructions are packed and transmitted to the remote display apparatus in a specified timing. The remote display apparatus receives the display instructions packets, reproduces the display instructions after correcting the displaying timing, and sends the reproduced display instructions to the display processing unit for displaying the graphics on a screen. A smoothly remote displaying can be thereby achieved in real time, and the bandwidth of network is also saved.

It should be noted that, the solution proposed in the invention is described by those embodiments in detail. However, it would be appreciated that the invention is not limited to above mentioned embodiments. Based on the disclosure of this specification, those skilled in the art may contemplate various modifications and changes to the described embodiments without apart from the spirit and scope of appended claims. The modifications and changes should fall into the scope of appended claims.

The invention claimed is:

1. A method, comprising:
converting a plurality of graphic elements which constitute a displayed graphic on a local monitor apparatus in each of a plurality of time periods into a plurality of corresponding display instructions;
generating a display time identifier for each of the plurality of time periods, the display time identifier incrementing at a predetermined interval;
associating each of the display time identifiers with a subset of the plurality of display instructions;
transmitting the display instructions and the associated display time identifiers to a remote display apparatus;
receiving the display instructions and the associated display time identifiers on the remote display apparatus;
storing the received display instructions and the associated display time identifiers;
identifying a minimum display time identifier;
setting a remote display time identifier equal to the identified minimum display time identifier;
increasing the remote display time identifier at each predetermined interval;
retrieving only the display instructions associated with a display time identifier less than the remote display time identifier; and
displaying the displayed graphic on the remote display apparatus in accordance with the display instructions.

2. The method according to claim 1, wherein:
at least one of the plurality of display instructions includes a type, a coordinate, and an attribute of at least one of the plurality of graphic elements.

3. The method of claim 2, wherein the type comprises one of a horizontal line, a vertical line, a slanting line, a rectangle, and a character.

4. The method of claim 2, wherein the attribute comprises one of a color and a length of the graphic element.

5. The method of claim 2, wherein the coordinate comprises one of a start point, an end point, and a vertex.

6. The method according to claim 1, further comprising:
packaging a subset of the plurality of display instructions into a packet in accordance with a generating sequence in a first predetermined time period;
adding a display time identifier to the packet, the display time identifier incrementing at an interval of the first predetermined time period.

7. The method according to claim 6, further comprising:
transmitting a plurality of the display instruction packets to the remote displaying apparatus at an interval of a second predetermined time period.

8. The method according to claim 6, wherein:
the first predetermined time period is a time period for displaying n graphics generated by the local monitor apparatus, and n is an integer larger than zero; and
the second predetermined time period is a multiple of the first predetermined time period.

9. The method according to claim 7, further comprising
storing the received display instruction packets in a buffer;
fetching out the display instruction packets at an interval of a displaying time period;
extracting out the display instructions in the display instruction packets; and
sending the extracted display instructions to a displaying part in accordance with the generating sequence.

10. A method, comprising:
converting a plurality of graphic elements which constitute a displayed graphic on a local monitor apparatus into a plurality of corresponding display instructions;
packaging a subset of the plurality of display instructions into a packet in accordance with a generating sequence in a first predetermined time period;
adding a display time identifier to the packet, the display time identifier incrementing at an interval of the first predetermined time period;
transmitting the display instructions to a remote display apparatus;
receiving the display instructions on the remote display apparatus;
storing the received display instruction packets in a buffer;
fetching out the display instruction packets at an interval of a displaying time period;

generating a remote display time identifier;

increasing the remote display time identifier once in every displaying time period;

setting the remote display time identifier in the first displaying time period equal to a minimum display time identifier in the received display instruction packets;

comparing the display time identifier in the received display instruction packets with the remote display time identifier when the display instruction packets are fetched out;

fetching out only the display instruction packets containing a display time identifier less than the remote display time identifier; and displaying the displayed graphic on the remote display apparatus in accordance with the display instructions.

11. The method according to claim 10, wherein, the length of displaying time period is equal to that of the first predetermined time period; and wherein the method further comprises:

correcting the remote display time identifier based on the number of display instruction packets stored in the buffer.

12. The method according to claim 11, further comprising:

increasing the remote display time identifier when the number of the display instruction packets stored in the buffer is larger than a predetermined value;

decreasing the remote display time identifier when of the number of display instruction packets stored in the buffer is less than the predetermined value; and maintaining the remote display time identifier when of the number of display instruction packets stored in the buffer is equal to the predetermined value.

13. A remote display apparatus, comprising:

a receiving unit, to receive a plurality of packets comprising display instructions and an associated display time identifier, the display instructions corresponding to graphic elements which constitute a graphic to be displayed;

a buffer to store the received packets, and wherein the packets are fetched out at an interval of a displaying time period;

a remote display time identifier unit to generate a remote display time identifier that increases once in every displaying time period, wherein during the first displaying time period, the remote display time identifier is set as equal to the minimum display time identifier in the received display instruction packets;

a comparison unit to compare the display time identifiers in the received display instruction packets to the remote display time identifier and to fetch out only the display instruction packets containing a display time identifier less than the remote display time identifier; and a displaying unit, to display the graphic in accordance with the display instructions obtained from the plurality of packets.

14. The apparatus according to claim 13, further comprising:

a buffer to store the received packets, and wherein the packets are fetched out at an interval of a displaying time period; and an extracting unit to extract the display instructions in the packets in accordance with a generating sequence.

15. A remote display apparatus, comprising:

a receiving unit, to receive a plurality of packets comprising display instructions, the display instructions corresponding to graphic elements which constitute a graphic to be displayed;

a displaying unit, to display the graphic in accordance with the display instructions obtained from the plurality of packets;

a buffer to store the received packets, and wherein the packets are fetched out at an interval of a displaying time period;

wherein, a remote display time identifier generated by the apparatus increases once in every displaying time period;

in the first displaying time period, the remote display time identifier is set as equal to the minimum display time identifier in the received display instruction packets;

the display time identifiers in the received display instruction packets are compared with the remote display time identifier when the display instruction packets are fetched out; and only the display instruction packets containing a display time identifier less than the remote display time identifier are fetched out.

16. The apparatus according to claim 15, wherein the current remote display time identifier is corrected based on the number of packets stored in the buffer.

17. The apparatus according to claim 16, wherein the current remote display time identifier is increased when the number of packets stored in the buffer is larger than a predetermined value;

wherein the current remote display time identifier is reduced when the number of packets stored in the buffer is less than the predetermined value; and wherein the current remote display time identifier is maintained when the number of packets stored in the buffer is equal to the predetermined value.

* * * * *